United States Patent
Guo et al.

(10) Patent No.: US 12,135,695 B2
(45) Date of Patent: Nov. 5, 2024

(54) DATA MIGRATION IN A DISTRIBUTED FILE SYSTEM

(71) Applicant: INTERNATIONAL BUSINESS MACHINES CORPORATION, Armonk, NY (US)

(72) Inventors: Jun Guo, Xi'an (CN); Xiang Yu Yang, Shaanxi (CN); Deng Xin Luo, Xian (CN); Na Liu, Xi'an (CN); Chen Yu Chang, Xi an (CN); Qin Dong Yin, Shiyan (CN)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 17/662,274

(22) Filed: May 6, 2022

(65) Prior Publication Data
US 2023/0359592 A1 Nov. 9, 2023

(51) Int. Cl.
*G06F 16/182* (2019.01)
*G06F 16/22* (2019.01)
(Continued)

(52) U.S. Cl.
CPC ........ *G06F 16/182* (2019.01); *G06F 16/2282* (2019.01); *G06F 16/24573* (2019.01); *G06F 16/285* (2019.01)

(58) Field of Classification Search
CPC ...... G06F 16/00; G06F 16/119; G06F 16/214; G06F 16/182; G06F 16/24573; G06F 16/285; G06F 16/2282
See application file for complete search history.

(56) References Cited

U.S. PATENT DOCUMENTS 6,571,258 B1 * 5/2003 Borowsky ............. G06F 3/0601
7,464,147 B1 * 12/2008 Fakhouri ................ G06Q 10/04
709/223

(Continued)

FOREIGN PATENT DOCUMENTS

CN 104077423 A 10/2014
CN 105718507 A 6/2016
(Continued)

OTHER PUBLICATIONS

"Copying Cluster Data Using DistCp", Cloudera, Aug. 3, 2021, 10 pages, <https://docs.cloudera.com/documentation/enterprise/6/6.3/topics/cdh_admin_distcp_data_cluster_migrate.html#/topic_7_2>.
(Continued)

*Primary Examiner* — Brittany N Allen
*Assistant Examiner* — William P Bartlett
(74) *Attorney, Agent, or Firm* — Edward J. Wixted, III

(57) ABSTRACT

In an approach, a processor obtains a configuration file of a distributed file system federation, the configuration file comprising a list of a plurality of subclusters within the distributed file system federation and migration trigger factors for the plurality of subclusters. A processor determines a list of one or more source subclusters and a list of to-be-migrated directories in the one or more source subclusters based on a scanning result of the plurality of subclusters and the migration trigger factors in the configuration file. A processor generates a migration plan to migrate the to-be-migrated directories from the one or more source subclusters to one or more target subclusters in the distributed file system federation.

13 Claims, 7 Drawing Sheets

(51) Int. Cl.
  *G06F 16/2457* (2019.01)
  *G06F 16/28* (2019.01)

(56) References Cited

U.S. PATENT DOCUMENTS

| | | | |
|---|---|---|---|
| 10,922,284 B1* | 2/2021 | Venkatasubramanian | ................... H04L 63/0807 |
| 2006/0129771 A1* | 6/2006 | Dasgupta | .............. G06F 3/0605 711/162 |
| 2008/0222218 A1* | 9/2008 | Richards | ................ G06F 3/0605 |
| 2009/0300134 A1* | 12/2009 | Smith | ........................ G06F 9/50 709/216 |
| 2010/0274826 A1* | 10/2010 | Takata | ................... G06F 3/0605 707/812 |
| 2017/0147399 A1* | 5/2017 | Cropper | .............. G06F 9/45533 |
| 2018/0203641 A1* | 7/2018 | Petrocelli | ............ H04L 67/1097 |
| 2018/0373456 A1* | 12/2018 | De Schrijver | ........ G06F 3/0611 |
| 2020/0174830 A1* | 6/2020 | Hermenier | ............ H04L 67/101 |
| 2021/0072917 A1* | 3/2021 | Surla | ...................... G06F 3/0683 |
| 2022/0358020 A1* | 11/2022 | Nehse | ................... G06F 3/0619 |

FOREIGN PATENT DOCUMENTS

| CN | 106294526 A | 1/2017 |
|---|---|---|
| CN | 104239493 B | 5/2017 |
| CN | 111258755 A | 6/2020 |
| CN | 112463762 A | 3/2021 |
| WO | 2020238858 A1 | 12/2020 |

OTHER PUBLICATIONS

"Hdfs cross-cluster data migration", CSDN, Sep. 16, 2019, 4 pages, <https://blog.csdn.net/sin_geek/article/details/100888632>.
Mell et al., "The NIST Definition of Cloud Computing", National Institute of Standards and Technology, Special Publication 800-145, Sep. 2011, 7 pages.

* cited by examiner

| Cluster to be migrated | path | Target cluster |
|---|---|---|
| SubCluster1 | /Tenent/tenet1 | SubCluster3 |
| SubCluster2 | /Users/test1 | SubCluster3 |
| SubCluster2 | /Data2/subData1/file1 | SubCluster4 |
| SubCluster2 | /tmp/subData1/file1 | SubCluster5 |

Figure 5B

DATA MIGRATION IN A DISTRIBUTED FILE SYSTEM

BACKGROUND

The present invention relates to distributed file systems, and more specifically, to processing data migration in a distributed file system.

As the amount of data that is generated has become increasingly large, different distributed data storage architectures have been proposed or implemented for storing large amounts of data in a computationally less intensive manner. An example of such a distributed storage architecture for storing large amounts of data (also referred to as "big data") is the Hadoop framework used for storing big data across a distributed arrangement of storage nodes (hereinafter referred to as 'data nodes').

A Hadoop Distributed File System (HDFS) is a distributed file system designed to run on commodity hardware. HDFS is highly fault-tolerant and is designed to be deployed on low-cost hardware. HDFS provides high throughput access to application data and is suitable for applications that have large data sets.

SUMMARY

According to some embodiments of the present invention, a computer-implemented method, computer program product, and computer system are provided. A processor obtains a configuration file of a distributed file system federation, the configuration file comprising a list of a plurality of subclusters within the distributed file system federation and migration trigger factors for the plurality of subclusters. A processor determines a list of one or more source subclusters and a list of to-be-migrated directories in the one or more source subclusters based on a scanning result of the plurality of subclusters and the migration trigger factors in the configuration file. A processor generates a migration plan to migrate the to-be-migrated directories from the one or more source subclusters to one or more target subclusters in the distributed file system federation.

BRIEF DESCRIPTION OF THE DRAWINGS

Illustrative embodiments of the present invention will now be described, by way of example only, with reference to the following drawings, in which:

FIG. 5B depicts a diagram illustrating an example of a migration plan, in accordance with an embodiment of the present invention.

DETAILED DESCRIPTION

Figure 1:
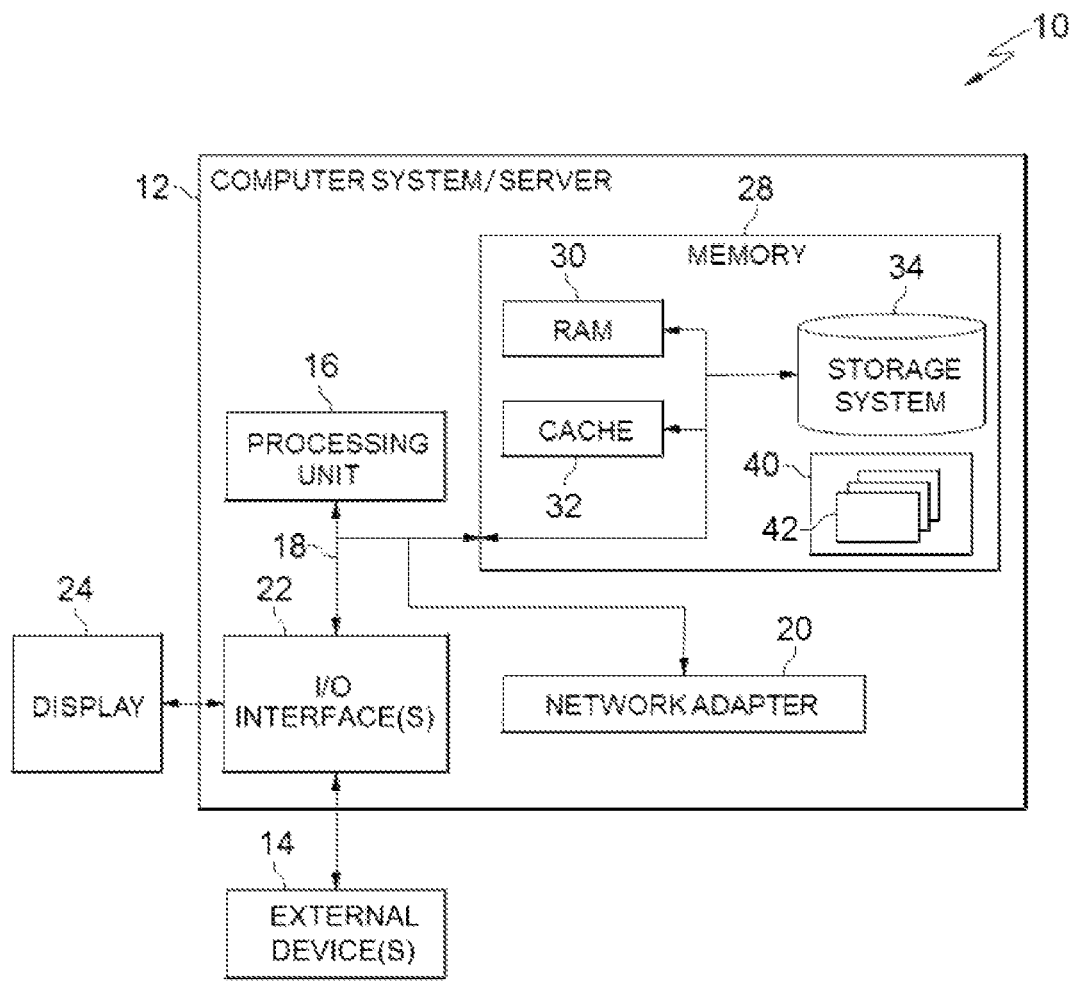
FIG. 1 depicts a cloud computing node, in accordance with an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
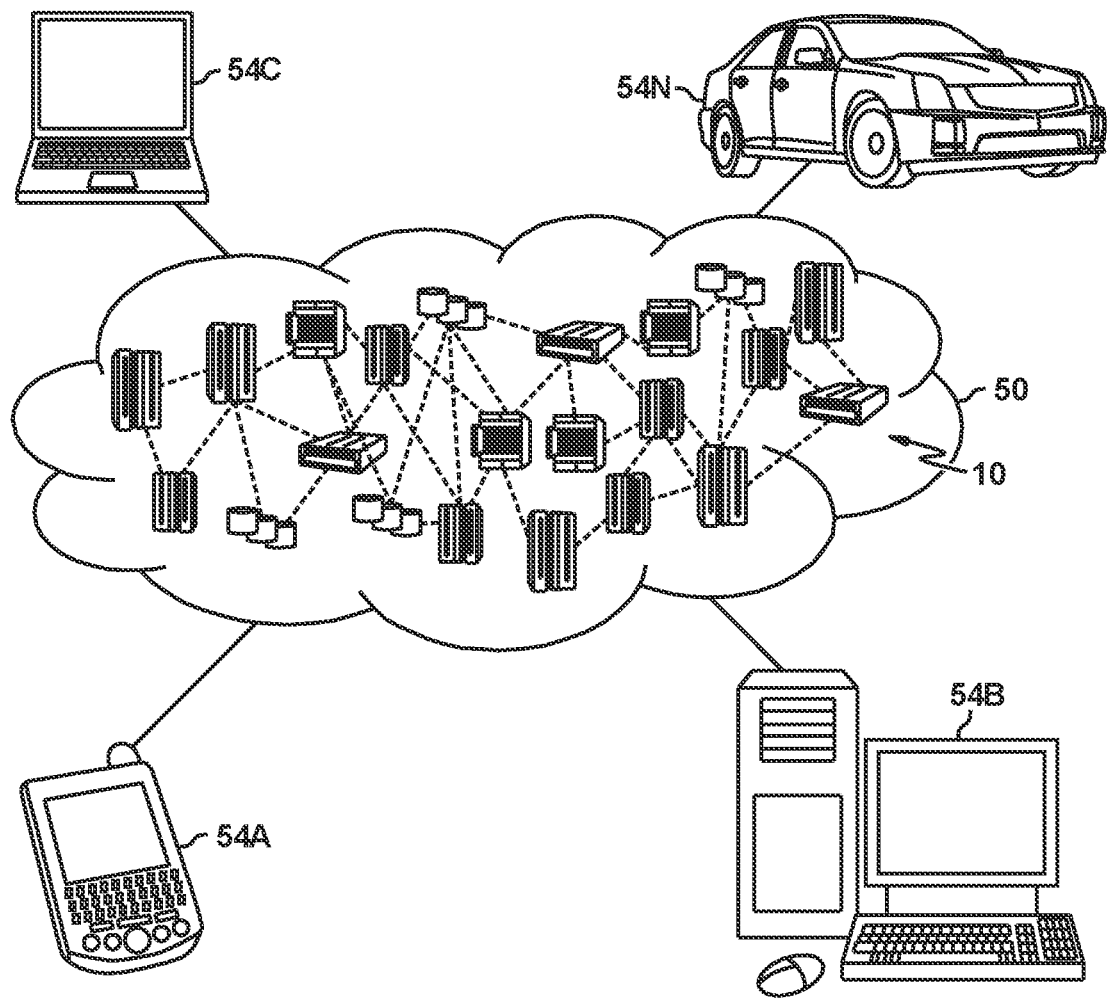
FIG. 2 depicts a cloud computing environment, in accordance with an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
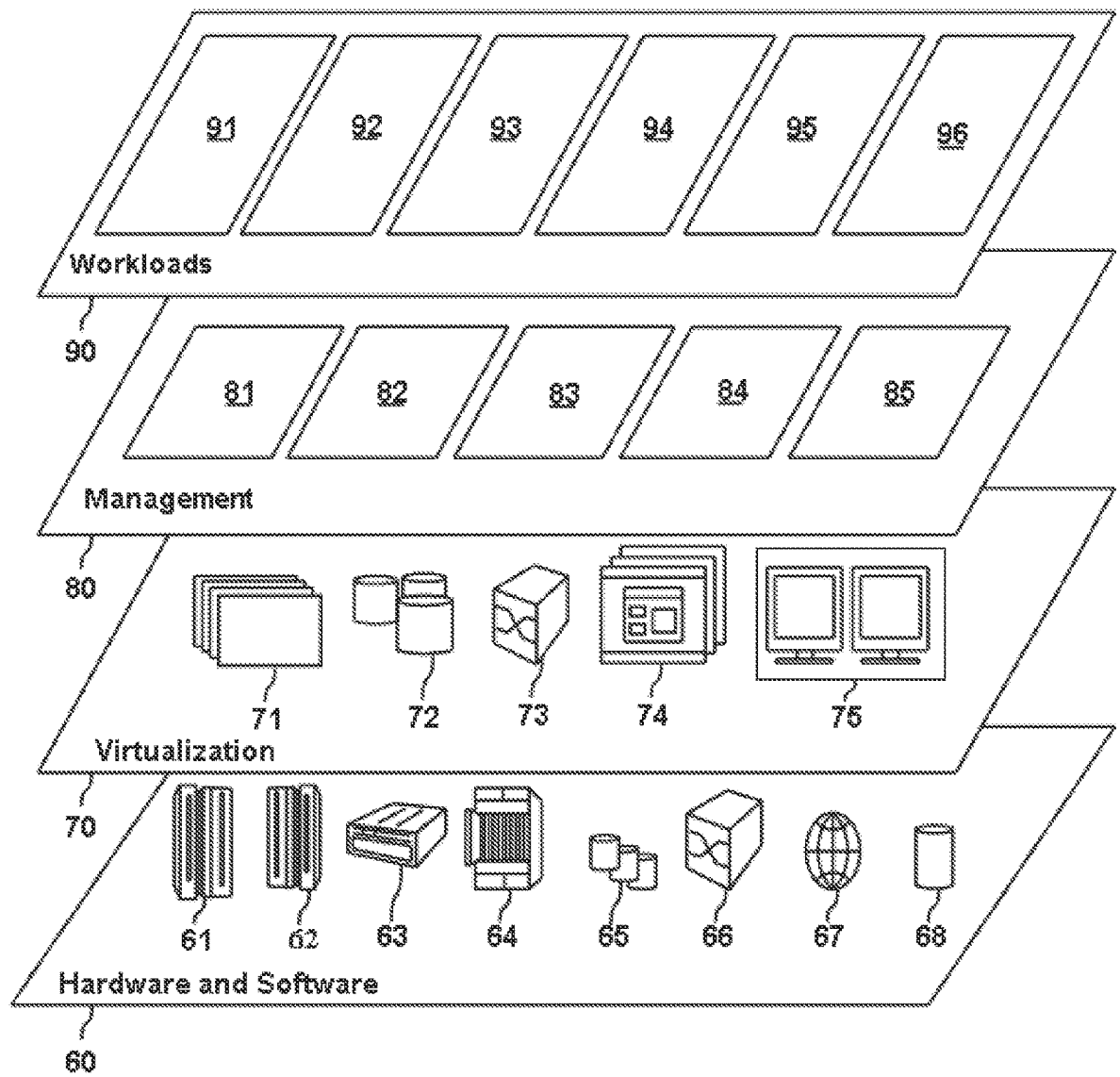
FIG. 3 depicts abstraction model layers, in accordance with an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data migration 96. Hereinafter, reference will be made to FIGS. 4-6 to describe details of the data migration 96.

As the most popular distributed storage in the big data world, the Hadoop Distributed File System (HDFS) is the most popular DFS used by different enterprises. An HDFS has a primary/secondary architecture. An HDFS cluster consists of a single name node, which is a primary node that manages the file system namespace and regulates access to files by clients. In addition, there are a number of data nodes. An HDFS exposes a file system namespace and allows user data to be stored in files. Internally, a file is split into one or more blocks and these blocks are stored in a set of data nodes. The name node executes file system namespace operations, such as, for example, opening, closing, and renaming files and directories. The name node also determines the mapping of blocks to data nodes. The data nodes are responsible for serving read and write requests from the file system's clients. The data nodes also perform block creation, deletion, and replication upon instruction from the name node. HDFS data nodes used for data storage can be expanded horizontally to increase storage capacity. However, due to the primary/secondary architecture, the name node as primary node will have a performance bottleneck when managing metadata because of the metadata overhead.

In order to scale the namespace horizontally, an HDFS federation may be utilized, which splits the filesystem into smaller subclusters and provides a federated view. An HDFS federation uses multiple independent name nodes and the multiple name nodes do not require coordination with each other. The data nodes are used as common storage for blocks by all the name nodes. Each data node registers with all the name nodes in the federation cluster.

To maintain the split of the subclusters (e.g., namespace partition), which forces users to connect to multiple subclusters and manage the allocation of folders/files to them, the Hadoop community provides the router-based federation solution, which connects multiple sub HDFS clusters through a service called Router to form a larger cluster. The Router forwards the request to the corresponding name node according to the mapping relationship which is stored in a mount table.

The name node of a subcluster stores metadata of actual data, such as filename, path, number of data blocks, block IDs, locations, secondary related configuration, etc. Due to the different amount of data and the settings of the mount table, the data storage in multiple subclusters will vary greatly over time. For example, the name node of subcluster A may have stored 9 million file paths, the name node of subcluster B may have stored 60,000 file paths, and the name node of subcluster C may have stored 3 million file paths. Assume that a common HDFS name node will encounter a performance bottleneck when the number of file paths reaches 10 million. Under such situation, in order to ensure the balance of service capabilities in each subcluster and the storage of each subcluster does not reach the upper limit, the operation and maintenance engineers may have to manually migrate data from one subcluster to another. Designing the data migration plan is an extremely cumbersome job and an automatic and intelligent way of migration data across the name nodes in the subclusters would be highly expected.

According to embodiments of the present invention, illustrative embodiments provide data migration planning which would greatly reduce the workload of maintenance engineers and maximize the business value of the HDFS federation architecture.

In the illustrative embodiments described below with reference to FIGS. 4-6, an HDFS router-based federation architecture is used as an example of the distributed file system. Please note that the HDFS router-based federation architecture is only presented for the purpose of illustration and is not intended to be exhaustive or limited to the embodiments disclosed. The illustrative embodiments of the present invention may also apply to any other suitable distributed file system federations.

In this method of illustrative embodiments, a configuration file of the distributed file system federation is obtained. The configuration file comprises a list of the plurality of subclusters within the distributed file system federation and migration trigger factors for the plurality of subclusters. A list of one or more source subclusters and a list of to-be-migrated directories in the one or more source subclusters are determined based on a scanning result of the plurality of subclusters and the migration trigger factors in the configuration file. A migration plan to migrate the to-be-migrated directories from the one or more source subclusters to one or more target subclusters in the distributed file system federation is generated.

Illustrative embodiments are capable of providing an automatic and intelligent way of data migration planning in a distributed file system, which would greatly reduce the workload of maintenance engineers and maximize the business value of the HDFS federation architecture. Therefore, illustrative embodiments provide one or more technical solutions that overcome a technical problem with providing an automatic and intelligent way to plan data migration in a distributed file system. As a result, these one or more technical solutions provide a technical effect and practical application in the field of data migration in a distributed file system.

Figure 4:
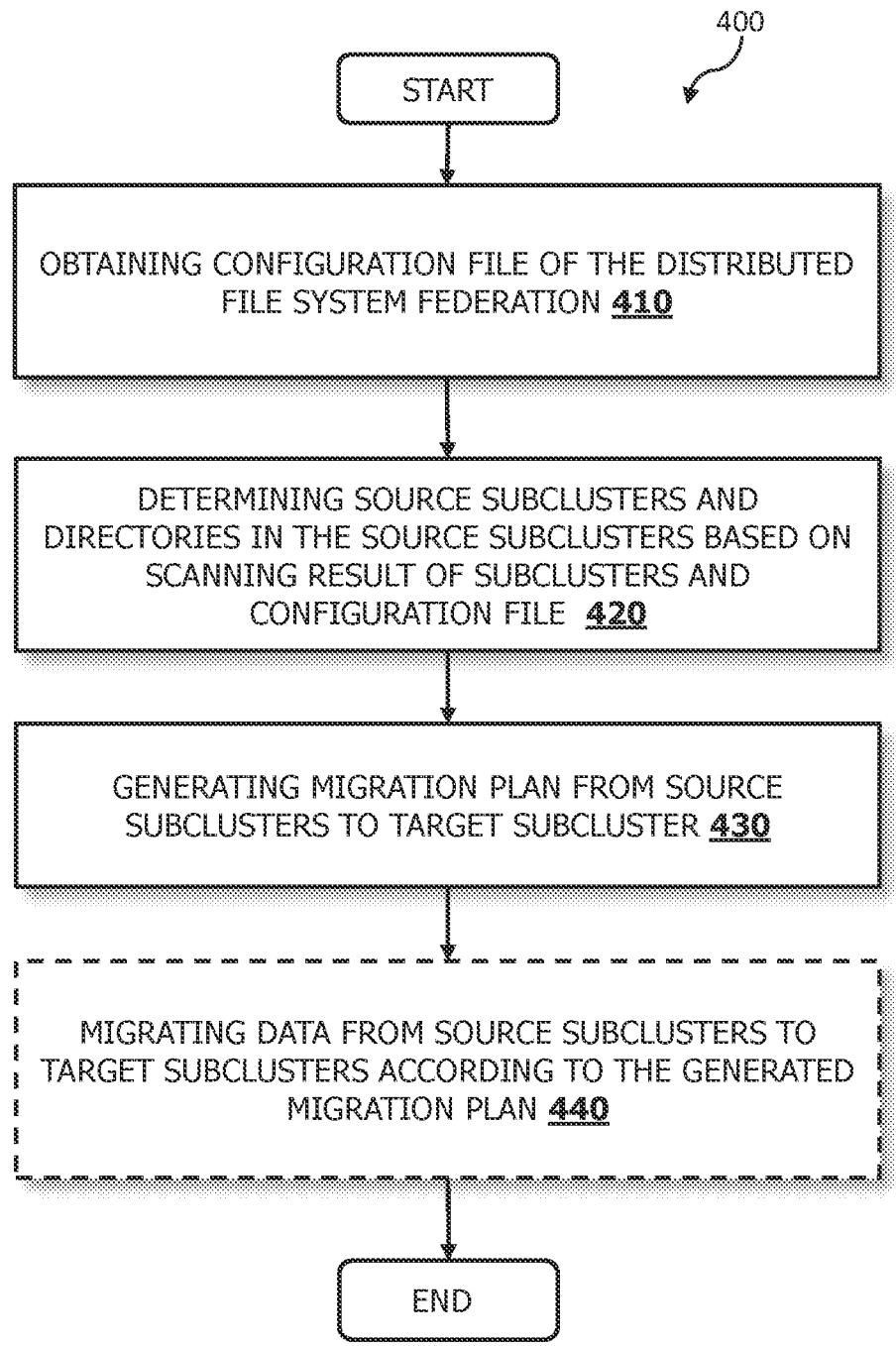
FIG. 4 depicts a flowchart illustrating a process for data migration, in accordance with an embodiment of the present invention.

With reference now to FIG. 4, a flowchart 400 illustrating a process for data migration in a distributed file system federation is shown in accordance with an illustrative embodiment of the present invention. The process shown in FIG. 4 may be implemented in a computer, such as, for example, computer system/server 12 in FIG. 1.

In step 410, the computer obtains a configuration file of the distributed file system federation. The distributed file system federation may include a plurality of subclusters. According to embodiments of the present invention, the distributed file system federation may be a HDFS router-based federation.

According to embodiments of the present invention, the configuration file may comprise a list of the plurality of subclusters in the distributed file system federation and migration trigger factors for the plurality of subclusters. Please note that in the context of the present invention, since there is a single name node for each subcluster in the federation, the subcluster may also be identified by its corresponding name node. And the terms "name node" and "subcluster" may be interchangeable in some context of the description. For example, the list of subclusters may be represented as namenode.list.

The migration trigger factors for a specific subcluster may include one or more of the followings factors: a threshold for the count of metadata (including the number of files, directories, etc.) in the name node of the subcluster, which may be represented as max.capacity, and the value may be, for example, 10 million; a percentage threshold when a data migration task should be triggered, such as the percentage of maximum used capacity of the name node, which may be represented as max.used.percentage, and the value may be, for example, 85%; expected percentage threshold of used capacity of the name node after migration, which may be represented as expected.used.percentage, and the value may be, for example, 50%; list of directories which may be migrated, which may be represented as dir.list.to.move, etc.

In step 420, the computer determines a list of one or more source subclusters and a list of to-be-migrated directories in the one or more source subclusters based on a scanning result of the plurality of subclusters and the migration trigger factors in the configuration file.

According to embodiments of the present invention, the computer may scan the subclusters according to the list of subclusters in the configuration file, and find out a list of source subclusters where the number of metadata in the current name node exceeds the value of max.capacity*max.used.percentage. For example, for a specific subcluster, if its max.capacity is 10 million, its max.used.percentage is 85%, and the number of metadata in the current name node of the subcluster is 9 million, which exceeds the value of 10*85%=8.5 million, the specific subcluster would be determined as a source subclusters.

According to embodiments of the present invention, the computer may further determine a list of to-be-migrated directories in the source subclusters which would be migrated according to the list of directories which may be migrated in the configuration file.

Figure 5A:
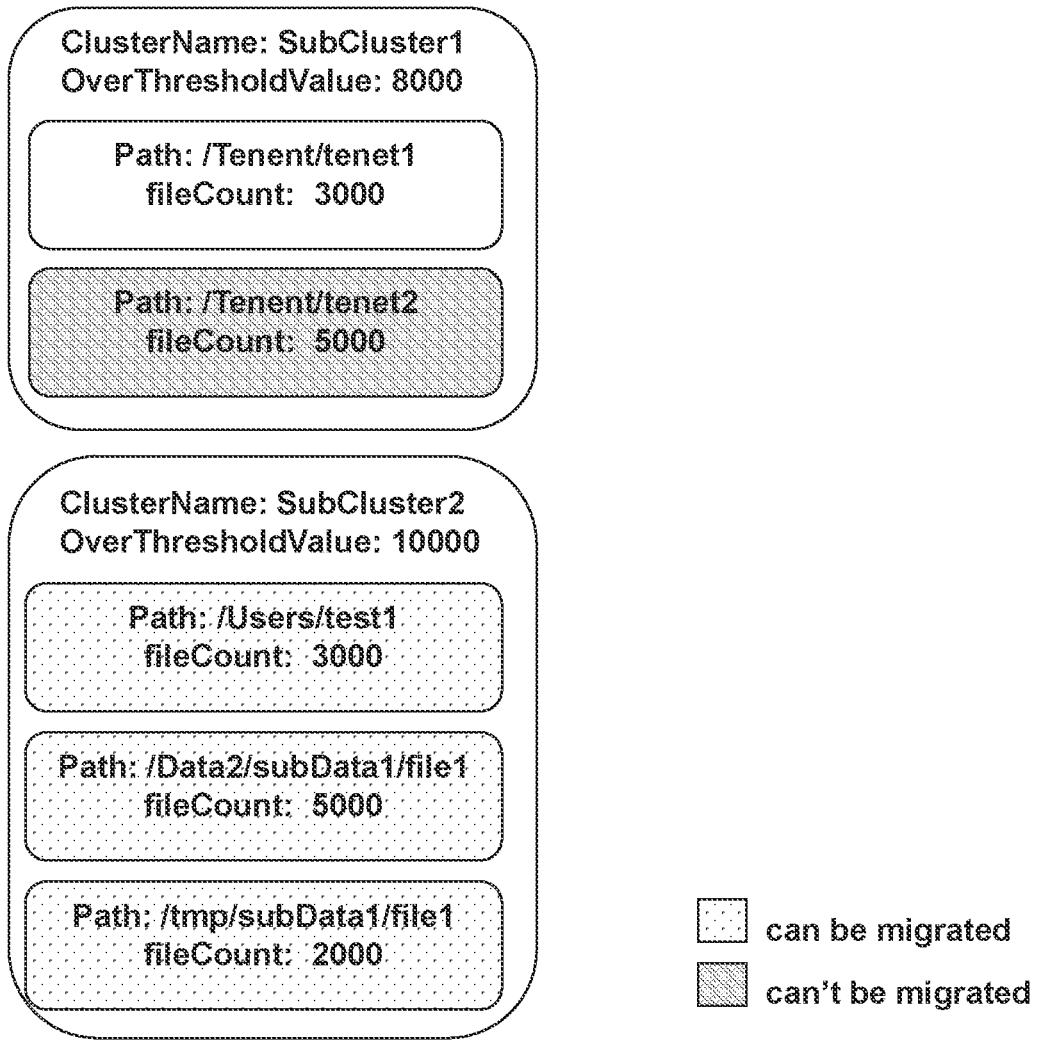
FIG. 5A depicts a diagram illustrating an example of a list of to-be-migrated directories, in accordance with an embodiment of the present invention.
Figure 6:
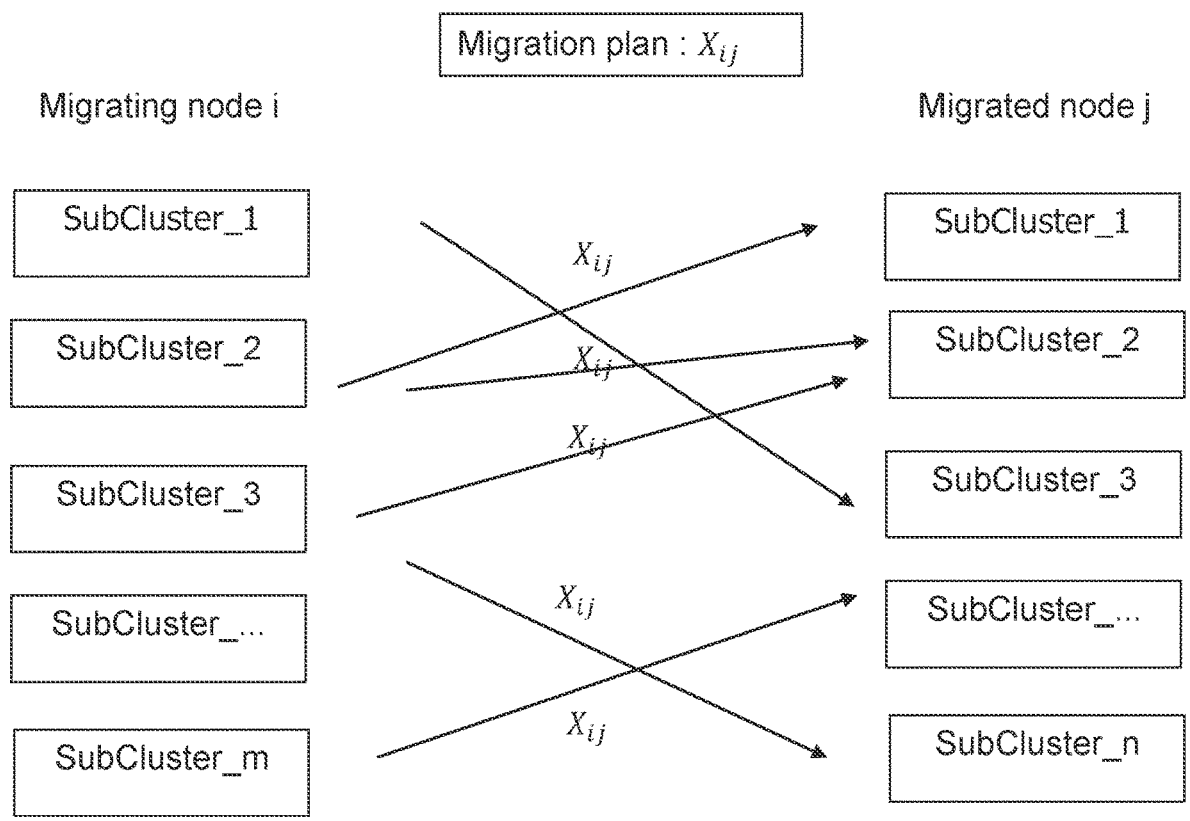
FIG. 6 depicts a diagram illustrating an example data migration process, in accordance with an embodiment of the present invention.

FIG. 5A depicts a diagram illustrating an example of a list of to-be-migrated directories in accordance with an illustrative embodiment of the present invention. As shown in FIG. 5A, in the subcluster named SubCluster1, the OverThresholdValue is 8,000, which means that as compared with expected capacity (for example, max.capacity*expected.used.percentage) of SubCluster1, there are 8,000 more files in the SubCluster1. Among the 8,000 files, 3,000 of them belongs to the directory of "Path: /Tenent/tenet1", which may be migrated, and 5,000 of them belongs to the directory of "Path: /Tenent/tenet2", which cannot be migrated according to the configuration file. And in the subcluster named SubCluster2, the OverThresholdValue is 10,000, which means as compared with the maximum allowable capacity of SubCluster2, there are 10,000 more files in the SubCluster2. Among the 10,000 files, 3,000 of them belongs to the directory of "Path: /Users/test1", 5,000 of them belongs to the directory of "Path: /Data2/subData1/file1", and 2,000 of them belongs to the directory of "Path: /tmp/subData1/file1". According to the configuration file, all files in those directories may be migrated. Therefore, in the example depicted in FIG. 5A, the first directory listed in the SubCluster1 and all directories listed in the SubCluster2 belong to the list of to-be-migrated directories.

Moving back to FIG. 4, in step 430, the computer generates a migration plan to migrate the to-be-migrated directories from the one or more source subclusters to one or more target subclusters. According to an embodiment of the present invention, the one or more target subclusters may be selected from the remaining subclusters in the federation other than the source subclusters. According to another embodiment of the present invention, the one or more target subclusters may be any one of the subclusters in the federation which can receive migration data. For example, for a source subcluster, after the directories with more files has been migrated out, the source subcluster may further receive directories with less files from other subclusters. Therefore, a source subcluster may also be a target subcluster in the migration plan.

FIG. 5B depicts a diagram illustrating an example of a migration plan in accordance with an illustrative embodiment of the present invention. The migration plan as shown in FIG. 5B is generated according to the list of to-be-migrated directories as shown in FIG. 5A and the storage situation in the name nodes of the subclusters in the federation.

According to embodiments of the present invention, the migration plan may be generated with a linear programming method. Linear programming is a method of optimizing operations with some constraints. The main objective of linear programming is to maximize or minimize the numerical value. Linear programming consists of linear functions which are subjected to the constraints in the form of linear equations or in the form of inequalities.

According to embodiments of the present invention, the linear programming method may include an objective function of maximizing the number of the subclusters meeting the expected capacity usage after migration, which is subject to constraints including capacity constraint and pruning constraint.

According to embodiments of the present invention, the capacity constraint may be that the capacity usage by each subcluster would not be higher than the maximus capacity usage of the subcluster. The capacity usage may be a percentage of capacity usage to the maximus capacity or an actual value of capacity usage.

According to embodiments of the present invention, the pruning constraint may be that the total amount to be migrated from one subcluster to another subcluster is less than a constant number. With the pruning constraint, the amount of computation for the linear programming would be reduced significantly since the number of iterations would be reduced. The constant number may be any suitable number for a pruning constraint. For example, the constant number may be a number being equal or less than the maximum number of metadata in the subcluster, the number of metadata that can be migrated in the subcluster, or any other suitable number.

An example of a linear programming model according to an embodiment of the present invention is described below. Please note that this example is only for purpose of illustration, and not intended to be exhaustive or limited to the embodiments disclosed. Any other suitable linear programming models may also be used herein for similar purpose.

In the example of the linear programming model, there are following defined parameters and variables:

Parameters may include:
For Migrating node (i) and Migrated node (j):
$Max_i$, $Max_j$: maximum capacity of the subcluster, such as, 10,000,000;
$MU_i$, $MU_j$: maximum usage percentage of the subcluster, such as: 85%;
$EU_i$, $EU_j$: percentage of expected usage of the subcluster, such as: 50%;
$E_i$, $E_j$: the current metadata size of the subcluster, such as: 2,000,000; and
$C_j$: a constant number for the subcluster, which may be the maximum capacity, the total number of metadata that may be migrated in the subcluster, etc.

Variables may include:
$X_{ij}$: The total amount to be migrated from node i to node j;
$S_i$: The capacity status of migrating node i after migration;
$S_j$: The capacity status of migrated node j after migration;

$$S_i = \begin{cases} 1, & \text{if percentage of used capacity } \frac{E_i - X_{ij}}{Max_i} \leq EU_i \\ 0, & \text{if percentage of used capacity } \frac{E_i - X_{ij}}{Max_i} > EU_i \end{cases}$$

in which, $$S_j = \begin{cases} 1, & \text{if percentage of used capacity } \frac{X_{ij} + E_j}{Max_j} \leq EU_j \\ 0, & \text{if percentage of used capacity } \frac{X_{ij} + E_j}{Max_j} > EU_j \end{cases}$$

With the above defined parameters and variables, the example linear programming model according to an embodiment of the present invention may be expressed as below:

Objective:

$$\text{Max } \Sigma_{i=1}^{m} S_i + \Sigma_{j=1}^{n} S_j$$

That is, after the migration of the total federation cluster is completed, the number of subclusters meeting the expected percentage of capacity usage is the largest.

Subject to: ( ), for node i:

$$\frac{X_{ij} + E_j}{Max_j} \leq MU_j$$

(Capacity Constraint: the total capacity used by each subcluster<=the maximum usage percentage)
$X_{ij}>0$ (Capacity Constraint: the capacity to be migrated for each subcluster needs to be a positive number)
$X_{ij}<=C_i$ //Pruning (Pruning Constraint)
$X_{ij}=\{0, 1, 2 \ldots \}$ (Integer)
$S_i=\{0, 1\}$ (Binary, the status of each subcluster after migration)
$S_j=\{0, 1\}$ (Binary, the status of each sub cluster after migration)

Finally, the migration plan $X_{ij}$ for the subclusters would be output.

According to a further embodiment of the present invention, another form of the linear programming model objective may be expressed as:

$$\text{Max } \Sigma_{j=1}^{m} a_i S_i + \Sigma_{j=1}^{n} b_j S_j$$

in which: $a_i$: priority weight of migrating subclusters, and $b_j$: priority weight of migrated subclusters.

With the above linear programming model, different priority weights of respective subclusters may be further considered.

Moving back to FIG. 4, in step 440, the computer migrates data from one or more source subclusters to one or more target subclusters according to the migration plan generated in step 430. FIG. 6 depicts a diagram illustrating an example data migration process in accordance with an illustrative embodiment of the present invention.

Various migration tools may be used to do the data migration between the source and the target subclusters, such as DistCp, DtIngest, and other tools provided by cloud vendors, etc. For example, DistCp (distributed copy) is a tool used for large inter/intra-cluster copying. DistCp uses MapReduce to effect its distribution, error handling and recovery, and reporting. DistCp expands a list of files and directories into input to map tasks, each of which will copy a partition of the files specified in the source list.

According to embodiments of the present invention, migration parameters may be adjusted dynamically based on the I/O information of the target subclusters. Using the example migration plan as shown in FIG. 5B as an example, for each row of data in the table of FIG. 5B, a DistCp job may be started and the mapper numbers of the job may be adjusted dynamically by monitoring the I/O situation in the target subclusters.

With the process illustrated in FIG. 4, illustrative embodiments provide an automatic and intelligent way to plan data migration in a distributed file system, which would significantly reduce the workload of operation and maintenance engineers of the distributed file system and. Furthermore, by using the linear programming algorithm to generate migration plan, illustrative embodiments maximize the business value of the distributed file system.

Thus, illustrative embodiments of the present invention provide a computer-implemented method, computer system, and computer program product for processing data migration in a distributed file system federation. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   obtaining a configuration file of a distributed file system federation, wherein:
   the distributed file system federation uses multiple independent subclusters;
   each subcluster is independently coordinated;
   a plurality of data nodes is used as common storage for blocks by all of the subclusters and each data node registers with all of the subclusters of the multiple independent subclusters; and
   the configuration file comprises a list of a plurality of subclusters within the distributed file system federation and migration trigger factors for the plurality of subclusters;
   determining, by one or more processors, a list of one or more source subclusters and a list of to-be-migrated directories in the one or more source subclusters based on a scanning result of the plurality of subclusters and the migration trigger factors in the configuration file; and
   migrating data from the one or more source subclusters to one or more target subclusters according to a generated migration plan, wherein the migration plan is generated, with linear programming, to migrate the to-be-migrated directories from the one or more source subclusters to the one or more target subclusters in the distributed file system federation, wherein:
   the linear programming includes an objective function of maximizing a number of subclusters meeting an expected capacity usage after migration;
   the objective function is subject to a pruning constraint; and
   the pruning constraint is that a total amount of metadata, comprising a number of files and directories, to be migrated from a source subcluster to a target subcluster is less than a constant number as determined from the migration trigger factors in the configuration file.

2. The computer-implemented method of claim 1, the migrating further comprising:
   adjusting migration parameters, dynamically, based on input/output (I/O) information of the one or more target subclusters.

3. The computer-implemented method of claim 1, wherein the constant number is a number equal to or lesser than a maximum number of metadata in a respective subcluster.

4. The computer-implemented method of claim 1, wherein the distributed file system federation is a Hadoop Distributed File System (HDFS) Router-based Federation.

5. A computer program product comprising:
   at least one computer readable storage medium, and program instructions collectively stored on the at least one computer readable storage medium, the program instructions comprising:
   program instructions to obtain a configuration file of a distributed file system federation, wherein:
   the distributed file system federation uses multiple independent subclusters;
   each subcluster is independently coordinated;
   a plurality of data nodes is used as common storage for blocks by all of the subclusters and each data node registers with all of the subclusters of the multiple independent subclusters; and
   the configuration file comprises a list of a plurality of subclusters within the distributed file system federation and migration trigger factors for the plurality of subclusters;
   program instructions to determine a list of one or more source subclusters and a list of to-be-migrated directories in the one or more source subclusters based on a scanning result of the plurality of subclusters and the migration trigger factors in the configuration file;
   program instructions to migrate data from the one or more subclusters to one or more target subclusters according to a generated migration plan, wherein the migration plan is generated, with linear programming, to migrate the to-be-migrated directories from the one or more source subclusters to the one or more target subclusters in the distributed file system federation: wherein:
   the linear programming includes an objective function of maximizing a number of subclusters meeting an expected capacity usage after migration;
   the objective function is subject to a pruning constraint; and
   the pruning constraint is that a total amount of metadata, comprising a number of files and directories, to be migrated from a source subcluster to a target subcluster is less than a constant number as determined from the migration trigger factors in the configuration file.

6. The computer program product of claim 5, the migrating further comprising:
   program instructions to adjust migration parameters, dynamically, based on input/output (I/O) information of the one or more target subclusters.

7. The computer program product of claim 5, wherein the constant number is a number equal to or lesser than a maximum number of metadata in a respective subcluster.

8. The computer program product of claim 5, wherein the distributed file system federation is a Hadoop Distributed File System HDFS) Router-based Federation.

9. A computer system comprising:
   one or more computer processors, one or more computer readable storage media, and program instructions collectively stored on the one or more computer readable storage media for execution by at least one of the one or more computer processors, the program instructions comprising:
   program instructions to obtain a configuration file of a distributed file system federation, wherein:
      the distributed file system federation uses multiple independent subclusters;
      each subcluster is independently coordinated;
      a plurality of data nodes is used as common storage for blocks by all of the subclusters and each data node registers with all of the subclusters of the multiple independent subclusters; and
      the configuration file comprises a list of a plurality of subclusters within the distributed file system federation and migration trigger factors for the plurality of subclusters;
   program instructions to determine a list of one or more source subclusters and a list of to-be-migrated directories in the one or more source subclusters based on a scanning result of the plurality of subclusters and the migration trigger factors in the configuration file;
   program instructions to migrate data from the one or more subclusters to one or more target subclusters according to a generated migration plan, wherein the migration plan is generated, with linear programming, to migrate the to-be-migrated directories from the one or more source subclusters to the one or more target subclusters in the distributed file system federation: wherein:
      the linear programming includes an objective function of maximizing a number of subclusters meeting an expected capacity usage after migration;
      the objective function is subject to a pruning constraint; and the pruning constraint is that a total amount of metadata, comprising a number of files and directories, to be migrated from a source subcluster to a target subcluster is less than a constant number as determined from the migration trigger factors in the configuration file.

10. The computer system of claim 9, the migrating further comprising:
    program instructions to adjust migration parameters, dynamically, based on input/output (I/O) information of the one or more target subclusters.

11. The computer system of claim 9, wherein the constant number is a number equal to or lesser than a maximum number of metadata in a respective subcluster.

12. The computer-implemented method of claim 1, wherein the migration trigger factors for the plurality of subclusters comprise, for a specific subcluster, a threshold for a count of the metadata.

13. The computer-implemented method of claim 1, wherein each subcluster executes file system namespace operations including opening, closing, and renaming files and directories.

* * * * *